United States Patent
Matsumoto et al.

(10) Patent No.: US 10,948,619 B2
(45) Date of Patent: Mar. 16, 2021

(54) ACOUSTIC TRANSDUCER

(71) Applicant: Schlumberger Technology Corporation, Sugar Land, TX (US)

(72) Inventors: Yoshino Matsumoto, Tokyo (JP); Kiyomitsu Hikida, Kanagawa-ken (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 201 days.

(21) Appl. No.: 15/764,155

(22) PCT Filed: Sep. 29, 2016

(86) PCT No.: PCT/US2016/054260
§ 371 (c)(1),
(2) Date: Mar. 28, 2018

(87) PCT Pub. No.: WO2017/058968
PCT Pub. Date: Apr. 6, 2017

(65) Prior Publication Data
US 2018/0275305 A1    Sep. 27, 2018

Related U.S. Application Data

(60) Provisional application No. 62/235,458, filed on Sep. 30, 2015.

(51) Int. Cl.
| | | |
|---|---|---|
| *G01V 1/52* | (2006.01) |
| *G01V 1/18* | (2006.01) |
| *G01V 1/40* | (2006.01) |
| *G10K 9/122* | (2006.01) |
| *B06B 1/06* | (2006.01) |
| *G10K 9/22* | (2006.01) |
| *G01V 1/02* | (2006.01) |

(52) U.S. Cl.
CPC ............... *G01V 1/52* (2013.01); *B06B 1/067* (2013.01); *G01V 1/159* (2013.01); *G01V 1/18* (2013.01); *G01V 1/181* (2013.01); *G01V 1/40* (2013.01); *G01V 1/523* (2013.01); *G10K 9/122* (2013.01); *G10K 9/22* (2013.01); *G01V 2001/526* (2013.01)

(58) Field of Classification Search
USPC ........................................................ 367/180
See application file for complete search history.

(56) References Cited

U.S. PATENT DOCUMENTS

| | | | |
|---|---|---|---|
| 5,130,950 A | 7/1992 | Orban et al. | |
| 6,354,146 B1 | 3/2002 | Birchak et al. | |
| 6,466,513 B1 | 10/2002 | Pabon et al. | |
| 6,995,500 B2 * | 2/2006 | Yogeswaren | B06B 1/0622 310/324 |

(Continued)

FOREIGN PATENT DOCUMENTS

WO    WO2013101694 A2    7/2013

OTHER PUBLICATIONS

International Search Report and Written Opinion issued in International Patent application PCT/US2016/054260, dated Jan. 12, 2017. 15 pages.

*Primary Examiner* — James R Hulka

(57) ABSTRACT

An acoustic transducer is provided. The acoustic transducer includes a housing, a backing, a piezocomposite element adjacent the backing within the housing, and a diaphragm covering on an outward facing surface of the piezocomposite element.

16 Claims, 3 Drawing Sheets

(56) References Cited

U.S. PATENT DOCUMENTS

| | | | | |
|---|---|---|---|---|
| 7,036,363 | B2* | 5/2006 | Yogeswaren | B06B 1/0622 73/152.16 |
| 7,447,324 | B2* | 11/2008 | Ogawa | B06B 1/0611 367/140 |
| 7,513,147 | B2* | 4/2009 | Yogeswaren | B06B 1/0622 310/334 |
| 10,416,330 | B2* | 9/2019 | Steinsiek | G01V 1/40 |
| 2005/0000279 | A1 | 1/2005 | Yogeswaren | |
| 2005/0001517 | A1 | 1/2005 | Yogeswaren | |
| 2006/0185430 | A1 | 8/2006 | Yogeswaren | |
| 2006/0221770 | A1* | 10/2006 | Ogawa | B06B 1/0611 367/140 |
| 2009/0213690 | A1 | 8/2009 | Steinsiek et al. | |
| 2012/0057730 | A1* | 3/2012 | Fujise | H04R 17/00 381/190 |
| 2013/0121514 | A1* | 5/2013 | Lee | H04R 31/00 381/190 |
| 2015/0165479 | A1* | 6/2015 | Lasiter | H01L 41/0973 310/322 |

* cited by examiner

ACOUSTIC TRANSDUCER

CROSS-REFERENCE TO RELATED APPLICATIONS

This application is based upon and claims the benefit of the priority of U.S. Provisional Application Ser. No. 62/235,458 entitled "ACOUSTIC TRANSDUCER APPARATUS, SYSTEM AND METHOD" filed on Sep. 30, 2015, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to acoustic transducers to send and receive acoustic signals. In particular, the present disclosure relates to acoustic transducers used in a very harsh downhole environment Hydrocarbon fluids such as oil and natural gas are obtained from a subterranean geologic formation, referred to as a reservoir, by drilling a well that penetrates the hydrocarbon-bearing formation. In order to find and process these formations, various tools are used to analyze the subterranean strata. One technique is the use of acoustic transducers to send and receive acoustic signals. However, in the area of drilling and measurements, acoustic transducers have to exhibit high sensitivity and reliability in a very harsh downhole environment.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, an acoustic transducer comprises a housing, a backing, a piezocomposite element adjacent the backing within the housing, and a diaphragm covering on an outward facing surface of the piezocomposite element.

In another aspect of the present disclosures, a downhole tool comprises an acoustic transducer. The acoustic transducer comprises a backing, a piezocomposite element adjacent the backing within the housing, and a diaphragm covering on an outward facing surface of the piezocomposite element.

In some embodiments of the disclosures herein, the outward facing surface of the piezocomposite element may be a concave surface and the diaphragm may be a concave diaphragm. The piezocomposite element may be in the shape of a concave disk. In some examples of disclosures, the diaphragm may be free to move as the backing expands and contracts without the diaphragm contacting the housing, or the diaphragm may provide uniform pressure to the outward facing surface and the periphery of the piezocomposite element when exposed to environmental pressure.

In the acoustic transducer disclosed herein, the diaphragm may cover on the outward facing surface and around a periphery of the piezocomposite element. Herein, an O-ring may be located between an outer surface of a periphery of the diaphragm and an inner surface of the housing. The diaphragm may be disposed to provide a space between a bottom edge of a periphery of the diaphragm and an inner shoulder of the housing. In some examples of the acoustic transducer, the diaphragm may be made of a thermoplastic material. A remaining space inside the housing may be filled with an elastomer.

In some examples of disclosures, the housing may function as a pressure bulkhead and a space between an outer surface of the housing and an inner surface of a tool body may be sealed with a rubber sealing. The acoustic transducer may be used in a drilling and measurement application, a wireline application, and so on, to provide acoustic borehole caliper measurements and/or borehole imaging.

Advantages and novel features of the disclosures will be set forth in the description which follows or may be learned by those skilled in the art through reading the materials herein. Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. Embodiments of an acoustic transducer and a downhole tool including the same according to the disclosures herein are described with reference to the following figures. The same numbers are used throughout the figures to reference like features and components. The drawings are as follows.

DETAILED DESCRIPTION

Figure 1:
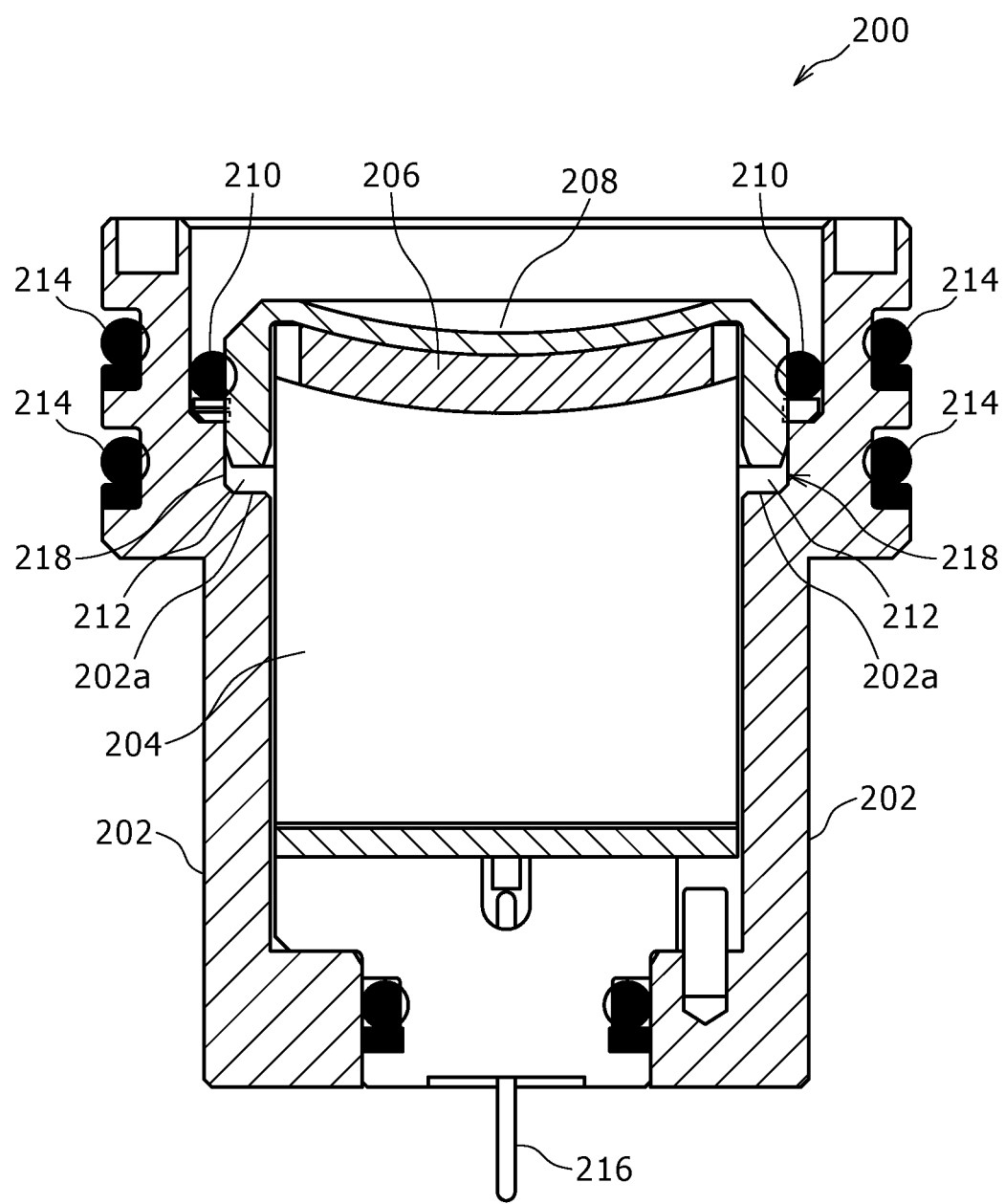
FIG. 1 is a cross-sectional view of one example of an acoustic transducer according to embodiments of the disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. Chemicals and chemical properties of interest in oilfield exploration and development may also be measured and stored by the sensing systems contemplated by the present disclosure. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Embodiments of the current disclosure are for reliable piezocomposite acoustic transducers that can be used in drilling and measurement applications, for one exemplary and non-limiting application. Embodiments of the acoustic transducer are configured to satisfy the high sensitivity and reliability requirements that may exist in harsh D&M (Drilling and Measurement) downhole environment, along with providing a high manufacturing yield.

In some embodiments of the disclosure, the acoustic transducer comprises three general acoustic elements of a piezocomposite element, a backing, and a diaphragm as a matching layer. In some cases, internal components of the acoustic transducer may be packaged in a metal housing. The housing may be mounted on a drill collar and function as a pressure bulkhead in some embodiments. The metal housing package may use rubber sealing such as O-rings in order to reduce uncertainty in the manufacturing process and to prevent gas penetration under severe downhole conditions. Any remaining space inside the package may be filled with an elastomer such as a silicone elastomer in order to withstand the high pressure generated downhole, for example, up to 30 kpsi. Filling the acoustic transducer with a silicone elastomer and not oil may help to avoid the swelling of a rubber based backing along with ensuring shock resistance and simplifying the assembly process.

However, filling the metal housing design with silicone elastomer may result in another issue, a situation in which downhole pressure induces non-uniform stress and deformation of the piezocomposite element. The non-uniform stress and deformation of the piezocomposite element can cause the depolarization of the piezocomposite element and consequently may result in the degradation of the acoustic transducer sensitivity.

In some embodiments of the current disclosure, the acoustic transducer may be designed to mitigate the depolarization of the piezocomposite element. In some instances, the embodiment mitigates the depolarization by using a concave diaphragm design. The concave diaphragm may be made of a thermoplastic material such as PEEK (PolyEther Ether Ketone) and PTFE (polytetrafluoroethylene). The concave diaphragm may cover the outer facing surface (referred to also as "primary surface") of the piezocomposite element and include going over the side surfaces located at the periphery of the piezocomposite element. At the side surfaces, an O-ring may be located in order to uniformly compress the piezocomposite element when exposed to hydrostatic pressure.

In some embodiments of the disclosure, ultrasonic transducers are used in drilling and measurement and wireline applications to provide acoustic borehole caliper measurements and borehole imaging. By replacing a piezoceramic with a piezocomposite element, the transmitter sensitivity is relatively higher. The increase in transmitter sensitivity enables embodiments of the ultrasonic transducers to be expanded into applications such as cement bond evaluation involving a thick casing, borehole imagining and caliper measurements in an enlarged hole, soft formation, attentive mud and under the existence of cutting.

In some embodiments of the current disclosure, the acoustic (ultrasonic) transducer may be used in some cases for drilling and measurement applications. In a drilling and measurement application, the acoustic transducer using a piezocomposite may be configured to provide high sensitivity for the transducer, reliability in a harsh downhole environment, and still result in a relatively high manufacturing yield.

Referring generally to exemplary FIG. 1, the cross section of an embodiment of this type of acoustic transducer package is shown in the figure. In the embodiment shown in FIG. 1, the acoustic transducer 200 comprises three general acoustic elements of a piezocomposite element 206, a backing 204 and a diaphragm 208 as a matching layer. The internal components of transducer are packaged in a metal housing 202 for this embodiment. This housing 202 is mounted on a drill collar and functions in part as a pressure bulkhead. For this mounting of the housing 202, a space between an outer surface of the housing 202 and an inner surface of the drill collar of a tool body is sealed with double O-rings 214 in order to reduce uncertainty in the manufacturing process and to prevent gas penetration under severe downhole conditions. Remaining space inside the package is filled with a silicone elastomer 212 in order to withstand high pressure. Filling with silicone elastomer 212 and not oil avoids the swelling of a rubber based backing, ensures shock resistance and simplifies the assembly process. In some cases, the backing 204 is tuned to match the frequency response of the piezocomposite element 206. The frequency response can be measured, for example, by acquiring output signals from the piezocomposite element 206 and/or by driving the piezocomposite element 206 via an electrical connector 216.

In contrast to the reliability advantages of a metal housing design filled with the elastomer such as a silicone elastomer, downhole pressure may induce non-uniform stress and deformation of the piezocomposite element 206. The non-uniform stress and deformation may cause the depolarization of the piezocomposite element 206 and consequently result in a degradation of the transducer sensitivity.

In order to minimize or mitigate the depolarization, the package may be configured to produce substantially uniform stress on the piezocomposite element 206, in some embodiments. A uniform stress condition is achieved in part through the design of diaphragm 208. In some embodiments of the disclosure, the diaphragm 208 may be made of thermoplastic material such as PEEK and PTFE, and may cover the piezocomposite element 206 over the outward facing surface and the side surfaces, where an O-ring 210 may be located at the side surfaces in order to uniformly compress the piezocomposite element 206 by hydrostatic pressure.

In addition, in order to avoid the diaphragm 208 contacting the shoulder 202a of the metal housing 202, which may constrain the movement of the diaphragm and alter the signals produced or received by the transducer 200, a space 218 is provided between the bottom of the diaphragm 208 and the shoulder 202a of the housing 202. With this design, when the backing 204 is expanded by temperature or compressed by pressure, the diaphragm 208 is allowed to follow the expansion or contraction of the backing displacement along an axial direction, making the acoustic transducer 200 less sensitive to temperature effects.

Figure 2:
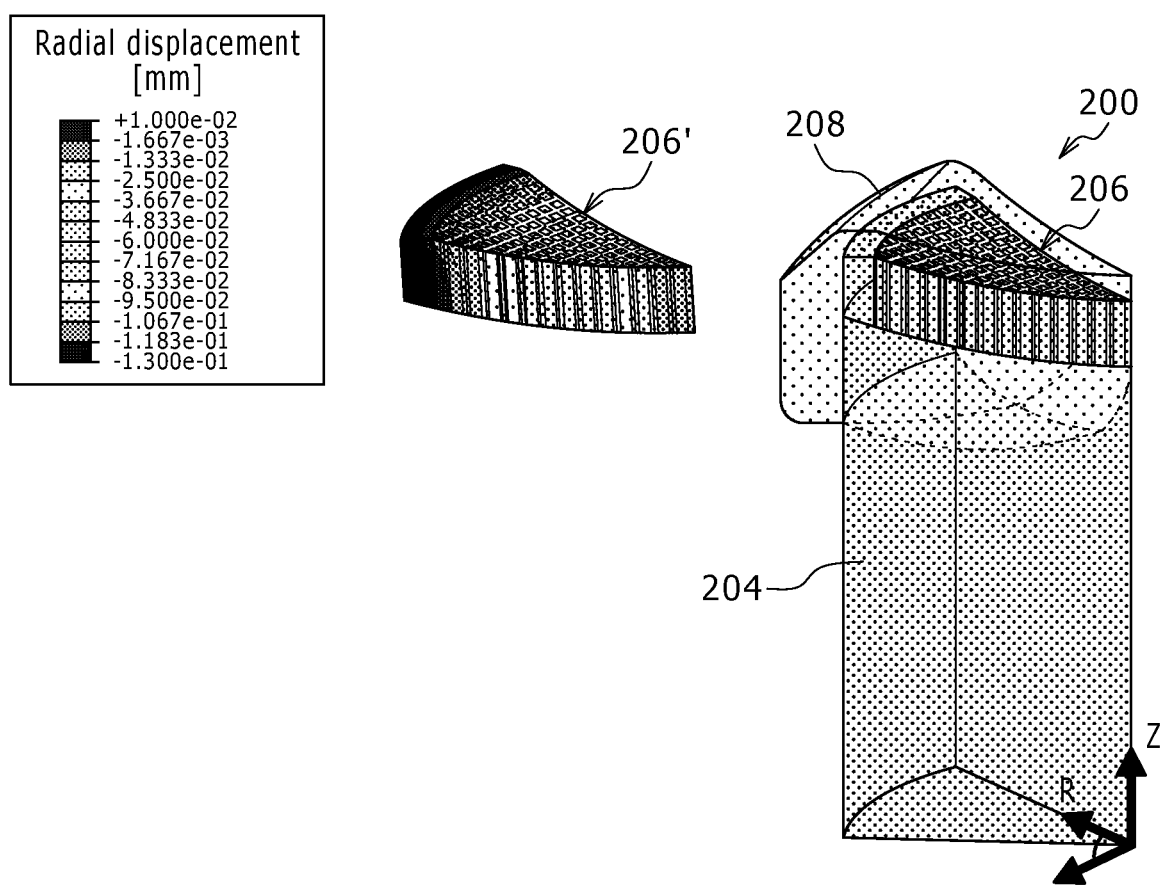
FIG. 2 shows representative models of the radial displacement of a portion of a bare piezocomposite element on the left and the radial displacement of a portion of a piezocomposite element, backing, and diaphragm according to an embodiment of the disclosure.

FIG. 2 shows representative models of the radial displacement of a portion of a bare piezocomposite element 206' and the radial displacement of a portion of a piezocomposite element 206, a backing 204 and a diaphragm 208 according to an embodiment of the disclosure. The concave shape of the piezocomposite element may be produced with the assistance of computer modeling. As seen in FIG. 2, structural analysis using a finite element method is performed to compare a bare piezocomposite element 206' subjected to uniform stress and an embodiment of the diaphragm 208, piezocomposite element 206 and backing 204 of the current disclosure, subjected to the same uniform stress as the bare piezocomposite. Both model geometries are ⅛ models of circular or columnar structures. The left side of FIG. 2 provides the results of the radial displacement of bare piezocomposite element 206'. The right side of FIG. 2 shows a section of an embodiment of some components of the acoustic transducer 200. Both models demonstrate the highest radial displacement near the center of the piezocomposite material. However, the results on the right side in FIG. 2 show a lower level of radial displacement near the center when exposed to near uniform stress along the top and side surfaces.

Figure 3:
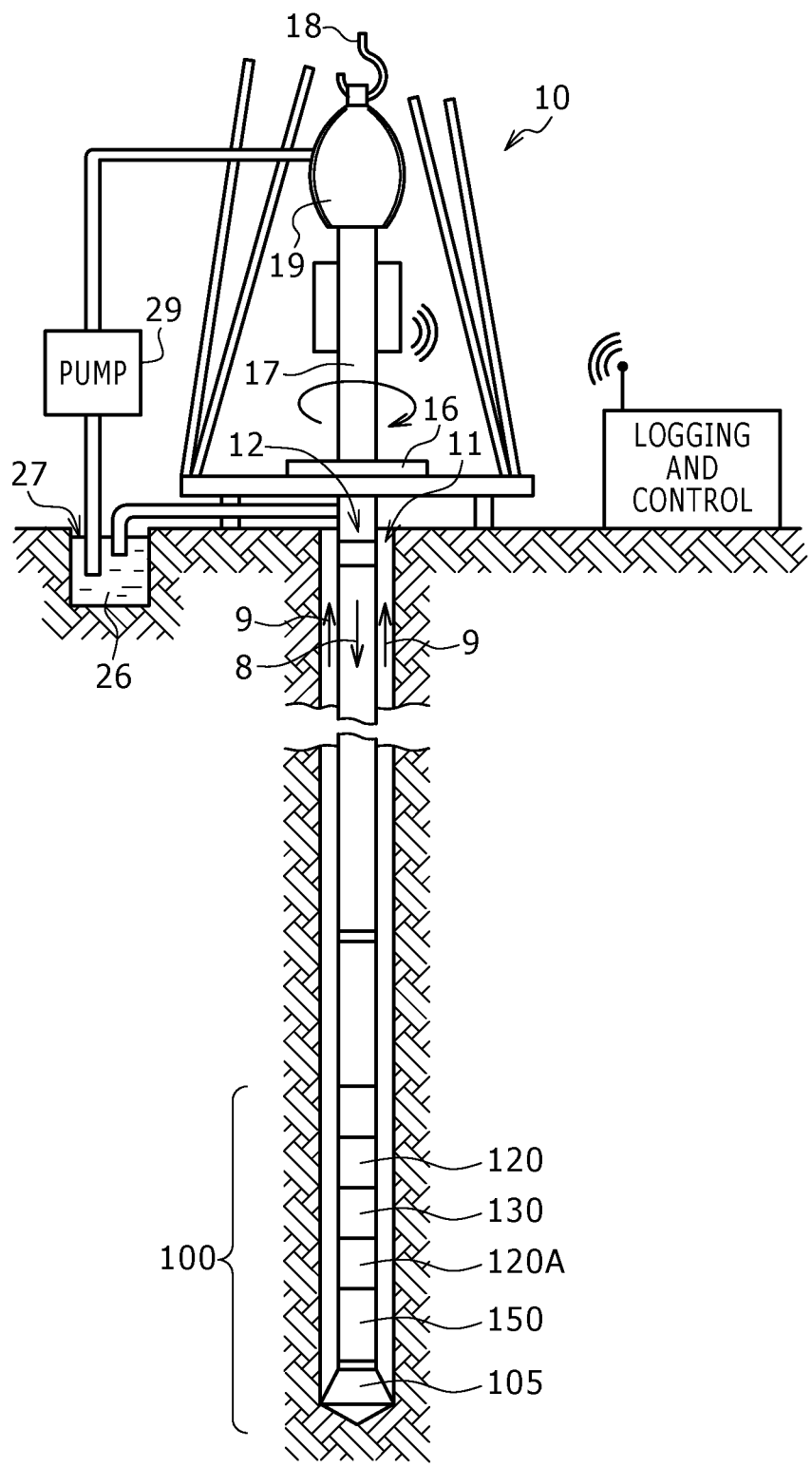
FIG. 3 is a schematic illustration of a wellsite system.

FIG. 3 illustrates a wellsite system in which the embodiments of the present disclosure can be employed. The wellsite can be onshore or offshore. In this exemplary system, a borehole 11 is formed in subsurface formations by rotary drilling in a manner that is well known. Embodiments of the present disclosure can also use directional drilling.

A drill string 12 is suspended within the borehole 11 and has a bottom hole assembly (BHA) 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block, through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well-known manner, the drilling fluid lubricates the drill bit 105 and carries formation cuttings up to the surface as it is returned to the pit 27 for recirculation.

The bottom hole assembly 100 of the illustrated embodiment has a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a sonic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. An acoustic transducer comprising:
   a housing;
   a backing;
   a piezocomposite element adjacent the backing within the housing; and
   a diaphragm covering and immediately adjacent to an outward facing surface of the piezocomposite element and the diaphragm covering a side surface of the piezocomposite element, the diaphragm providing uniform pressure to the outward facing surface and the side surface of the piezocomposite element when exposed to environmental pressure.

2. The acoustic transducer according to claim 1, wherein the outward facing surface of the piezocomposite element is a concave surface and the diaphragm is a concave diaphragm.

3. The acoustic transducer according to claim 2, wherein the piezocomposite element is in the shape of a concave disk.

4. The acoustic transducer according to claim 1, wherein the diaphragm is free to move as the backing expands and contracts without the diaphragm contacting the housing.

5. The acoustic transducer according to claim 1, wherein an O-ring is located between an outer surface of a periphery of the diaphragm and an inner surface of the housing.

6. The acoustic transducer according to claim 1, wherein the diaphragm is disposed to provide a space between a bottom edge of a periphery of the diaphragm and an inner shoulder of the housing.

7. The acoustic transducer according to claim 1, wherein the diaphragm is made of a thermoplastic material.

8. The acoustic transducer according to claim 1, wherein a remaining space inside the housing is filled with an elastomer.

9. A downhole tool comprising an acoustic transducer, wherein the acoustic transducer comprises: a housing; a backing; a piezocomposite element adjacent the backing within the housing; and a diaphragm covering and immediately adjacent to an outward facing surface of the piezocomposite element and the diaphragm covering a side surface of the piezocomposite element, the diaphragm providing uniform pressure to the outward facing surface and the side surface of the piezocomposite element when exposed to environmental pressure.

10. The downhole tool according to claim 9, wherein the outward facing surface of the piezocomposite element is a concave surface and the diaphragm is a concave diaphragm.

11. The downhole tool according to claim 10, wherein the piezocomposite element is in the shape of a concave disk.

12. The downhole tool according to claim 9, wherein the diaphragm is free to move as the backing expands and contracts without the diaphragm contacting the housing.

13. The downhole tool according to claim 9, wherein an O-ring is located between an outer surface of a periphery of the diaphragm and an inner surface of the housing.

14. The downhole tool according to claim 9, wherein the diaphragm is disposed to provide a space between a bottom edge of a periphery of the diaphragm and an inner shoulder of the housing.

15. The downhole tool according to claim 9, wherein the diaphragm is made of a thermoplastic material.

16. The downhole tool according to claim 9, wherein a remaining space inside the housing is filled with an elastomer.

* * * * *